United States Patent [19]
Jyh-Long

[11] Patent Number: 5,103,872
[45] Date of Patent: Apr. 14, 1992

[54] STRUCTURE OF AIR CONDUIT FLANGE AND SHOCK-ABSORBING CONNECTOR

[76] Inventor: Chang Jyh-Long, 6F, No. 20, Bao Ching St., Taipei, Taiwan

[21] Appl. No.: 584,511

[22] Filed: Sep. 18, 1990

[51] Int. Cl.⁵ .............................................. F16L 23/00
[52] U.S. Cl. .................................... 138/158; 138/120; 138/155; 285/364; 285/405
[58] Field of Search ............... 138/109, 155, 120, 158, 138/DIG. 4; 285/324, 363, 364, 424, 405

[56] References Cited

U.S. PATENT DOCUMENTS

| | | | |
|---|---|---|---|
| 2,126,499 | 8/1938 | Petersen | 138/DIG. 4 |
| 3,647,247 | 3/1972 | Pintard et al. | 138/119 |
| 3,712,650 | 1/1973 | Mez | 285/405 |
| 4,123,094 | 10/1978 | Smitka | 285/405 |
| 4,252,350 | 2/1981 | Smitka | 285/363 |
| 4,516,797 | 5/1985 | Meinig | 285/405 |
| 4,542,923 | 9/1985 | LaCrosse | 285/364 |
| 4,566,724 | 1/1986 | Arnoldt et al. | 285/364 |
| 4,739,802 | 4/1988 | Meinig | 138/DIG. 4 |
| 4,865,365 | 9/1989 | Meinig | 138/109 |

FOREIGN PATENT DOCUMENTS 90469 6/1896 Fed. Rep. of Germany ... 138/DIG. 4

Primary Examiner—James E. Bryant, III
Attorney, Agent, or Firm—Bacon & Thomas

[57] ABSTRACT

An air conduit flange structure has a plurality of flange strip elements connected by angle connections. Each flange strip element is formed by folding a plate into an L-shape with its two opposite end edges defining a guide space, having a plurality of retainer projections and slide way portions for retaining a plurality of connecting strips which are formed in the casing of the air conduit. A shock-absorbing connector has two opposite metal end portions with a canvas connection. The metal end portions each have a plurality of raised porotrusions around its edge for fastening the two opposite end edges to the flange strip elements. Rubber strips are respectively attached to the air conduit flange and the shock-absorbing connector to protect against air leakage.

4 Claims, 3 Drawing Sheets

STRUCTURE OF AIR CONDUIT FLANGE AND SHOCK-ABSORBING CONNECTOR

BACKGROUND OF THE INVENTION

The present invention is related to air conduits and more particularly to built-up type of air conduit with improvements on the structure of flanges and connectors, which can be conveniently built-up without the use of any tools or fastening means.

In high-rise buildings and more particularly in modern office buildings, central air conditioning systems are generally used for keeping humidity and temperature at desired levels. A central air conditioning system generally comprises a plurality of air conduits for guiding filtrated streams of air to desired locations. Regular air conduits for central air conditioning systems are generally comprised of a plurality of casings each having a plurality of flanges. According to the conventional method, screws and nuts and/or other fastening elements must be used for fastening the parts of an air conduit into the desired shape. During assembly, various hand tools may be required. Further, rubber packing must be separately attached to seal gaps against air leakage. Therefore, it is very difficult to set up an air conduit for a central air conditioning system, or to dismantle such an air conduit.

SUMMARY OF THE INVENTION

The present invention has been devised to eliminate the aforesaid problems. It is the main object of the present invention to provide an air conduit which can be conveniently built up without the use of any tools or fastening means.

According to one aspect of the present invention, an air conduit comprises a plurality of wall sections connected with a plurality of flanges. Each flange is comprised of a plurality of flange strip elements respectively connected by a plurality of angle connections. Each flange strip element is formed by folding a plate into shape with its two opposite end edges defining a guide space therebetween, which space has a plurality of retainer projections and slide way portions therein for retaining a plurality of connecting protrusions which are formed in the wall sections.

According to another aspect of the present invention, an air conduit comprises section walls and flanges respectively connected by shock-absorbing connectors. Each shock-absorbing connector is comprised of two opposite metal end portions with a canvas connected therebetween through an adhesive connection. The metal end portions each have a plurality of raised protrusions around its edge for fastening the two opposite end portions to the flange strip elements which are connected together to form flange.

DETAILED DESCRIPTION OF THE PREFERRED EMBODIMENT

Figure 1B:
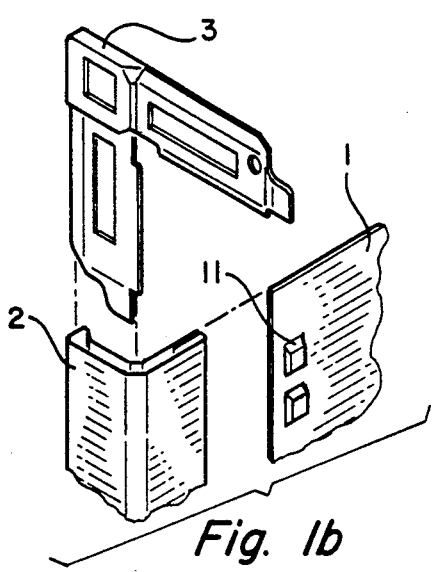
FIG. 1B is a partial, exploded perspective view illustrating the corner construction of the embodiment shown in FIG. 1A.
Figure 1A:
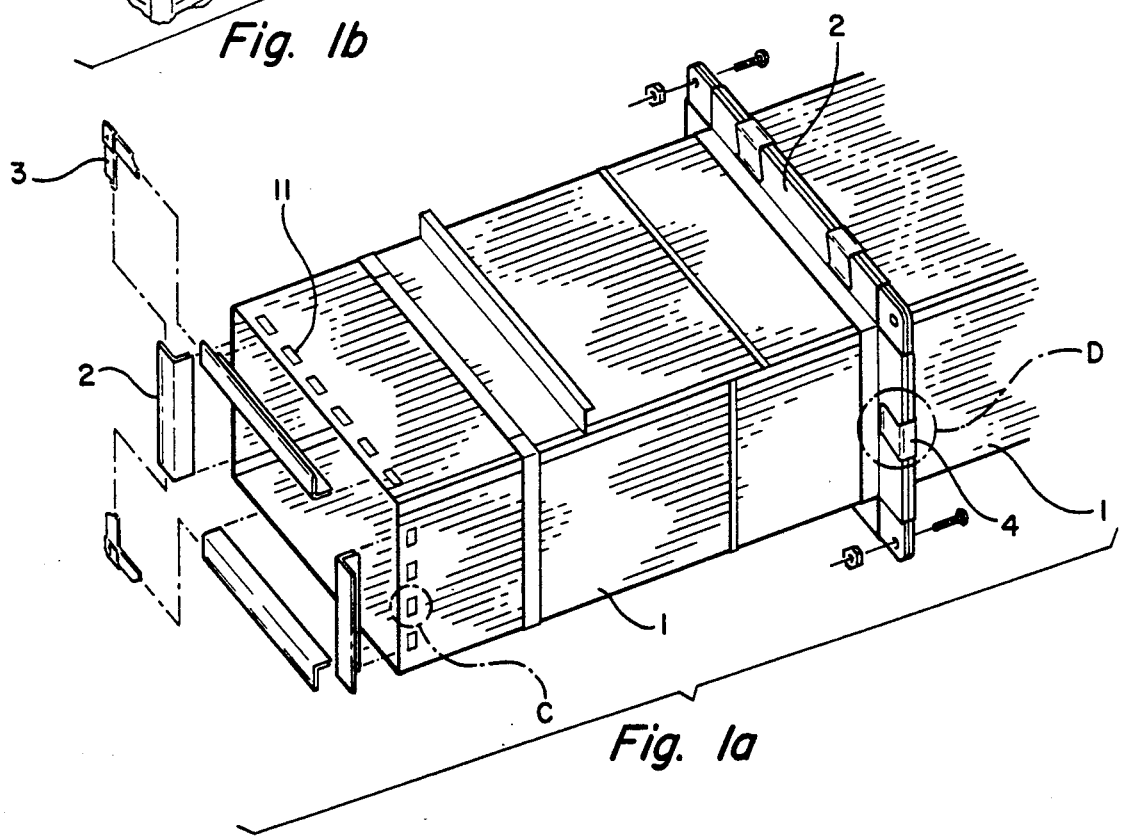
FIG. 1A is a perspective structural, partially exploded view of an air conduit according to the present invention.
Figure 1C:
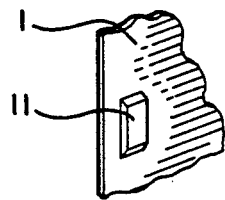
FIG. 1C is a partial perspective view of the detail C in FIG. 1A.
Figure 1D:
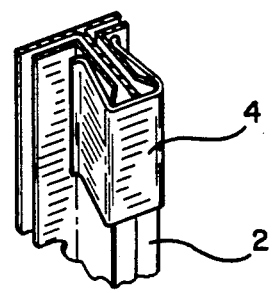
FIG. 1D is a partial, perspective view of the detail D in FIG. 1A.

Referring to FIG. 1A, an air conduit of the present invention is generally comprised of section walls 1 for composing the conduit, flange strip elements 2 for composing the flanges for the conduit, angle connections 3 for fastening the flange strip elements 2 at the corners, and flange clamps 4 for clamping together the built-up flanges.

Flange strip elements 2 are formed by folding a plate into a general L-shape, as illustrated in FIGS. 3A-3F, with its two opposite end edges 21, 22 defining a guide space 25 therebetween. The flange strip element 2 has, inside the two opposite end edges 21, 22 a plurality of retainer projections 24, defining therewith a plurality of slide way portions 23, in which the retainer projections 24 are respectively disposed. The length of the retainer projection is slightly smaller than the length of the sliding way portions 23. Each section wall 1 has a plurality of unitary connecting protrusions 11 bent in shape suitable for insertion through the guide space 25 into the sliding way portions 23 of each flange strip element 2. Because the connecting protrusions 11 are respectively disposed in a plane displaced away from and in parallel with the section wall 1, they become firmly retained by the retainer projections 24 once they are inserted through the guide space 25 into the sliding way portions 23. The middle bent portion 110 engages retainer projections 24 to retain the wall section 1 inside the gap defined by the two opposite end edges 21, 22. Various shapes of generally L-shaped strip elements 2 and connecting protrusions 11 are illustrated in FIGS. 3A-3F.

Figure 2B:
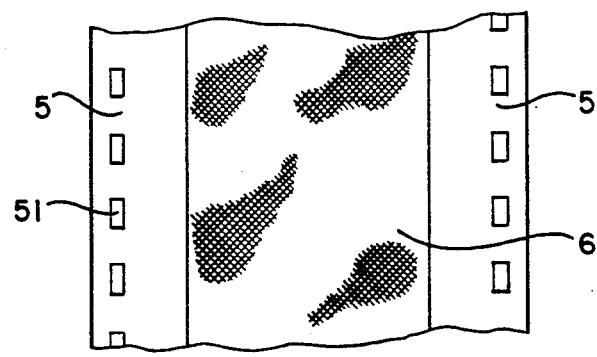
FIG. 2B is a partial side view of the air conduit connector of FIG. 2A.
Figure 2A:
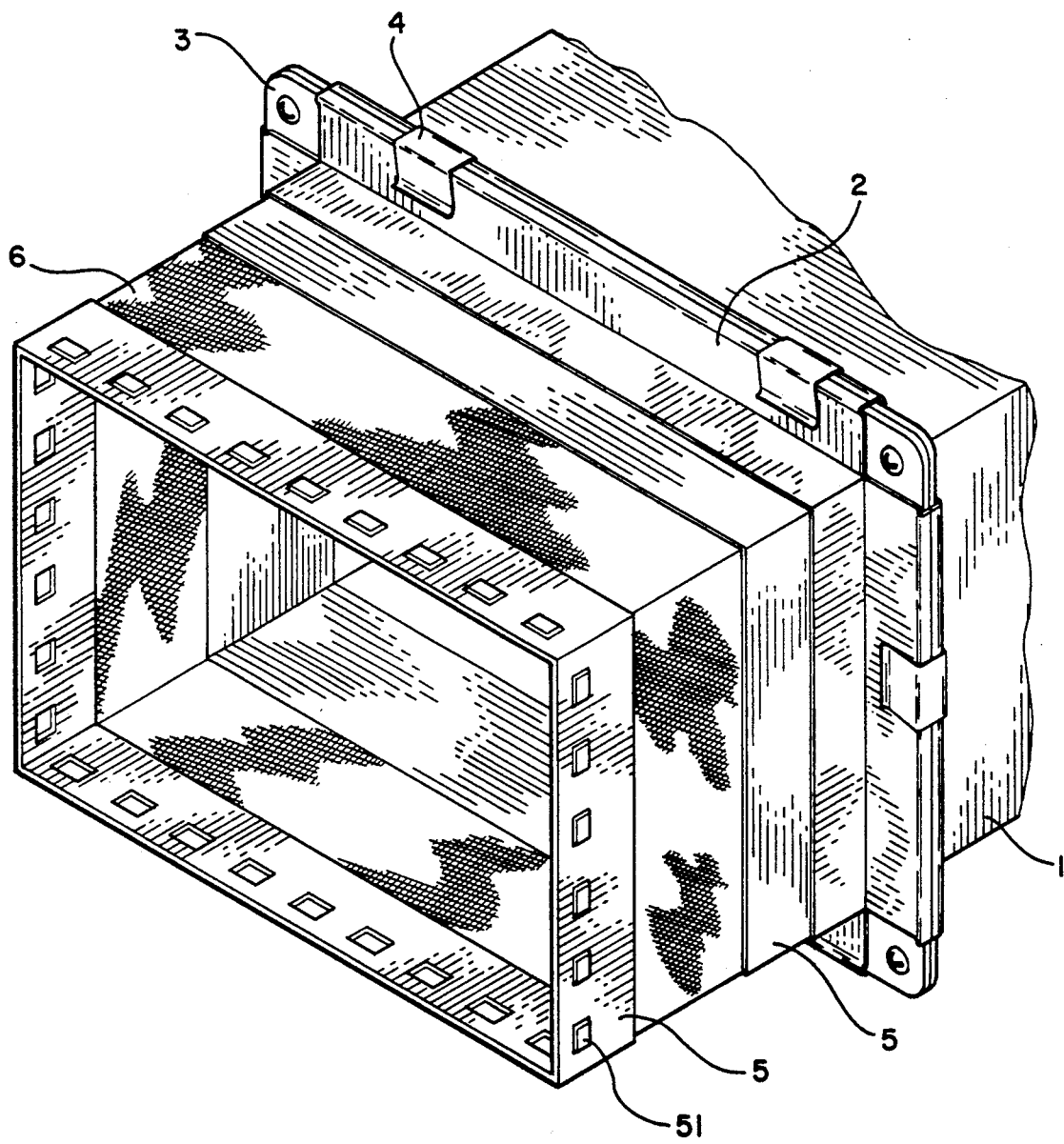
FIG. 2A is a perspective view of an air conduit according to an alternative embodiment of the present invention.
Figure 3A:
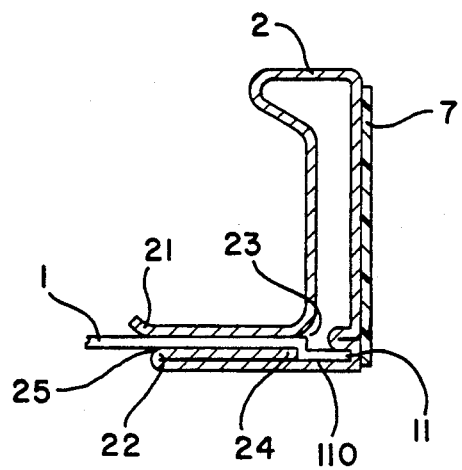
FIGS. 3A-3F are cross-sectional views illustrating various forms of the flange of the present invention.
Figure 3B:
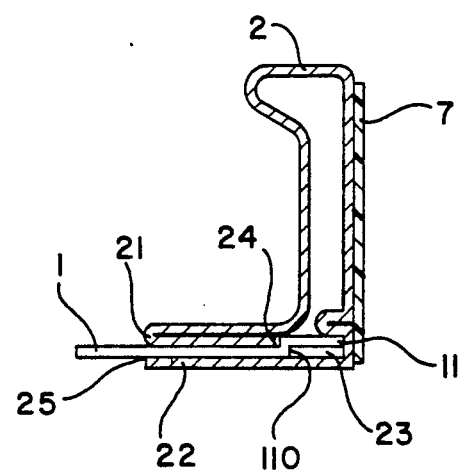
Figure 3C:
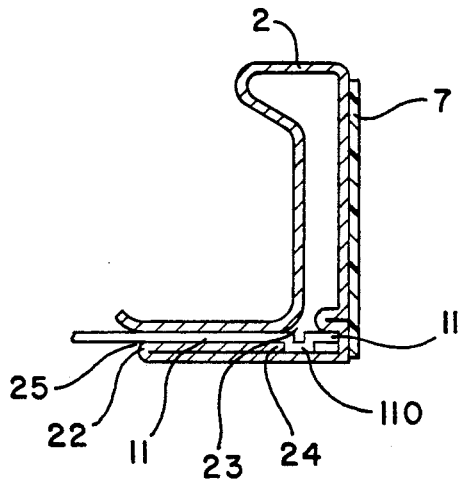
Figure 3D:
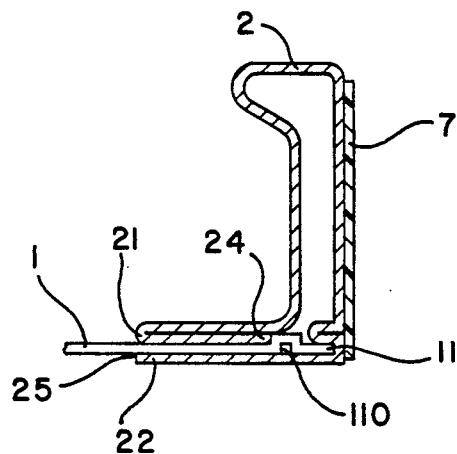
Figure 3E:
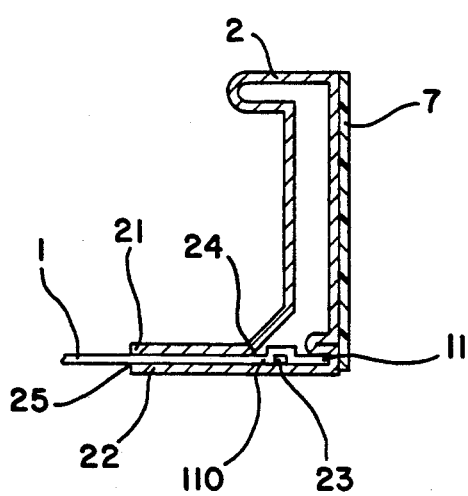
Figure 3F:
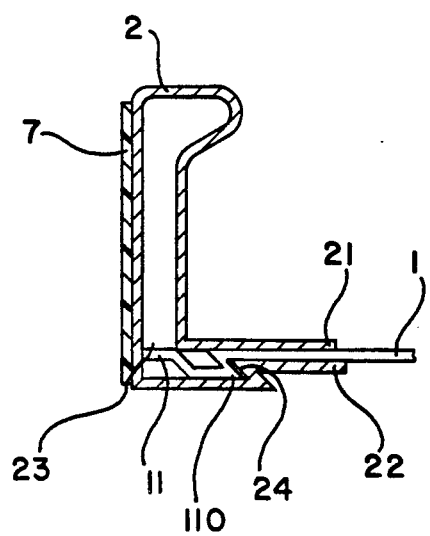

Referring to FIGS. 2A and 2B, an air conduit connector of the present invention comprises two opposite metal end portions 5 with a canvas 6 connected therebetween. The two opposite metal end portions 5 have each a plurality of raised protrusions 51 around the edge for fastening between the two opposite end edges 21, 22 of the flange strip elements 2, similar to connecting protrusions 11. Further, the flange strip elements 2 and the angle connections 3 respectively have a rubber strip 7 attached at one side during their respective manufacturing processes. This arrangement facilitates the operation in building up an air conduit.

I claim:

1. An air conduit system comprising:
   a) a plurality of section walls for forming the air conduit, each of the section walls defining connecting protrusions;
   b) a plurality of flange strip elements, each having a generally L-shaped configuration with opposite end edges defining a guide space therebetween adapted to accept a portion of the section walls defining the connecting protrusions, each flange strip element further defining a plurality of retainer projections within the guide space and located so as to engage the connecting protrusions on the section walls so as to attach the flange strip elements to the section walls;

c) a plurality of angle connections for fastening adjacent flange strip elements of the same section wall together;

d) at least one shock-absorbing connector comprising opposite metal end portions interconnected by a flexible material, each of the end portions defining connecting protrusions for fastening flange strip elements thereto; and, e) flange clamps adapted to attach adjacent flange strip elements of different section walls and the at least one shock absorbing connector together.

2. The air conduit of claim 1, wherein said flange strip elements have each a rubber strip fixedly attached thereto to protect the conduit against air leakage.

3. The air conduit of claim 1, wherein said angle connections have each a rubber strip fixedly attached thereto to protect the conduit against air leakage.

4. The air conduit system of claim 1 wherein the flexible material connecting the metal end portions of the shock absorbing connector is a canvas material.

* * * * *